US007181730B2

(12) United States Patent
Pitsianis et al.

(10) Patent No.: US 7,181,730 B2
(45) Date of Patent: Feb. 20, 2007

(54) METHODS AND APPARATUS FOR INDIRECT VLIW MEMORY ALLOCATION

(75) Inventors: Nikos P. Pitsianis, Durham, NC (US); Benjamin Strautin, Cambridge, MA (US); Sanjay Banerjee, Durham, NC (US); Gerald G. Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 873 days.

(21) Appl. No.: 09/886,855

(22) Filed: Jun. 21, 2001

(65) Prior Publication Data

US 2002/0019910 A1 Feb. 14, 2002

Related U.S. Application Data

(60) Provisional application No. 60/212,987, filed on Jun. 21, 2000.

(51) Int. Cl.
*G06F 9/44* (2006.01)
*G06F 9/45* (2006.01)

(52) U.S. Cl. .................. 717/132; 717/151; 717/152; 717/161; 712/209

(58) Field of Classification Search ............... 717/132, 717/136–161; 712/244, 24, 209
See application file for complete search history.

(56) References Cited

U.S. PATENT DOCUMENTS

| 5,442,790 | A | * | 8/1995 | Nosenchuck | 717/155 |
|---|---|---|---|---|---|
| 5,790,858 | A | * | 8/1998 | Vogel | 717/130 |
| 5,848,255 | A | * | 12/1998 | Kondo | 712/212 |
| 5,930,508 | A | * | 7/1999 | Faraboschi et al. | 717/158 |
| 6,044,450 | A | * | 3/2000 | Tsushima et al. | 712/24 |
| 6,175,948 | B1 | * | 1/2001 | Miller et al. | 716/7 |
| 6,305,014 | B1 | * | 10/2001 | Roediger et al. | 717/154 |
| 6,367,076 | B1 | * | 4/2002 | Imai et al. | 717/152 |
| 6,457,173 | B1 | * | 9/2002 | Gupta et al. | 717/149 |
| 6,507,947 | B1 | * | 1/2003 | Schreiber et al. | 717/160 |
| 6,598,221 | B1 | * | 7/2003 | Pegatoquet et al. | 717/152 |
| 6,647,547 | B1 | * | 11/2003 | Kanamaru et al. | 717/151 |
| 6,651,247 | B1 | * | 11/2003 | Srinivasan | 717/161 |
| 6,658,551 | B1 | * | 12/2003 | Berenbaum et al. | 712/24 |
| 6,675,380 | B1 | * | 1/2004 | McKinsey et al. | 717/161 |
| 6,735,690 | B1 | * | 5/2004 | Barry et al. | 712/244 |
| 6,738,893 | B1 | * | 5/2004 | Rozas | 712/24 |
| 6,748,589 | B1 | * | 6/2004 | Johnson et al. | 717/150 |
| 6,754,893 | B2 | * | 6/2004 | Granston et al. | 717/161 |
| 6,772,414 | B1 | * | 8/2004 | Roediger et al. | 717/160 |
| 2002/0112228 | A1 | * | 8/2002 | Granston et al. | 717/155 |
| 2003/0200420 | A1 | * | 10/2003 | Pechanek et al. | 712/209 |

OTHER PUBLICATIONS

Diwan et al., Memory system performance of programs with intensive heap allocation, Aug. 1995, ACM Transactions on Computer Systems (TOCS), vol. 13 Issue 3, pp. 1-30.*

(Continued)

*Primary Examiner*—Wei Zhen
*Assistant Examiner*—Satish S. Rampuria
(74) *Attorney, Agent, or Firm*—Priest & Goldstein, PLLC

(57) ABSTRACT

Techniques and a set of heuristics are described to perform allocation of the special instruction memory where indirect very long instruction words (VLIW's) are stored for the ManArray family of multiprocessor digital signal processors (DSP). This approach substantially reduces the cost of pre-initializing the contents of VLIWs.

36 Claims, 7 Drawing Sheets

OTHER PUBLICATIONS

Marcelo et al., Cache performance of fast-allocating programs, Oct. 1995, Proceedings of the seventh international conference on Functional programming languages and computer architecture, pp. 1-13.*

Suhyun et al., Unroll-based register coalescing, May 2000, Proceedings of the 14th international conference on Supercomputing, pp. 1-10.*

Chaitin, Register Allocation & Spilling via graph Coloring, ACM, 1982, pp. 98-105.*

Eichenberger et al., Register allocation for predicted code, IEEE, Dec. 1995 pp. 180-191.*

Muresan et al., Current consumption dynamics at instruction and program level for a VLIW DSP processor, IEEE, 2001, pp. 130-135.*

Zalamea et al., Modulo scheduling with integrated register spilling for clustered VLIW architectures, IEEE, 2001 pp. 160-169.*

* cited by examiner

FIG. 2A

LV Encoding

| 31 30 | 29 | 28 27 26 25 | 24 | 23 22 | 21 20 19 18 | 17 | 16 | 15 | 14 | 13 | 12 | 11 | 10 | 9 | 8 | 7 6 5 4 3 2 1 0 |
|---|---|---|---|---|---|---|---|---|---|---|---|---|---|---|---|---|
| Group | S/P | CtrlOp | E/D | UAF | InstrCnt | 0 | 0 | 0 | SU | LU | ALU | MAU | DSU | Vb | 0 | VIMOFFS |

FIG. 2B

LV Syntax/Operation

```
Instruction  Operands            Operation
LV.[SP]      V[01], VIMOFFS,     (V[01]+VIMOFFS)[SU].enable  ← 0 if (D = S)
             InstrCnt,           (V[01]+VIMOFFS)[LU].enable  ← 0 if (D = L)
             D = {SLAMD},        (V[01]+VIMOFFS)[ALU].enable ← 0 if (D = A)
             F = [AMDN]          (V[01]+VIMOFFS)[MAU].enable ← 0 if (D = M)
                                 (V[01]+VIMOFFS)[DSU].enable ← 0 if (D = D)

(V[01]+VIMOFFS)[UAF] ← ALU  if (F = A or F =)
                                 (V[01]+VIMOFFS)[UAF] ← MAU  if (F = M)
                                 (V[01]+VIMOFFS)[UAF] ← DSU  if (F = D)
                                 (V[01]+VIMOFFS)[UAF] ← None if (F = N)

for (i = 0;i < InstrCnt;i++){
                                    Load instruction into (V[01]+VIMOFFS)
                                    if (SU Instr AND D! = S){(V[01]+VIMOFFS)[SU].enable  ← 1}
                                    if (LU Instr AND D! = L){(V[01]+VIMOFFS)[LU].enable  ← 1}
                                    if (ALU Instr AND D! = A){(V[01]+VIMOFFS)[ALU].enable ← 1}
                                    if (MAU Instr AND D! = M){(V[01]+VIMOFFS)[MAU].enable ← 1}
                                    if (DSU Instr AND D! = D){(V[01]+VIMOFFS)[DSU].enable ← 1}
```

FIG. 3A

XV Encoding

←— 300

| 31 30 | 29 | 28 27 26 25 | 24 | 23 22 | 21 | 20 | 19 | 18 | 17 | 16 | 15 | 14 | 13 | 12 | 11 | 10 | 9 | 8 | 7 6 5 4 3 2 1 0 |
|---|---|---|---|---|---|---|---|---|---|---|---|---|---|---|---|---|---|---|---|
| Group | S/P | CtrlOp | VX | UAF | 0 | 0 | 0 | 0 | 0 | 0 | 0 | SU | LU | ALU | MAU | DSU | Vb | 0 | VimOffs |

FIG. 3B

XV Syntax/Operation

←— 310

| Instruction | Operands | Operation |
|---|---|---|
| XV.[SP] | V[01], VIMOFFS,<br>E = (SLAMD), F = [AMDN] | Execute(V[01]+VIMOFFS)[SU] if (E = S)<br>Execute(V[01]+VIMOFFS)[LU] if (E = L)<br>Execute(V[01]+VIMOFFS)[ALU] if (E = A)<br>Execute(V[01]+VIMOFFS)[MAU] if (E = M)<br>Execute(V[01]+VIMOFFS)[DSU] if (E = D)<br><br>(V[01]+VIMOFFS)[UAF] ←— ALU if (F = or F = A)<br>(V[01]+VIMOFFS)[UAF] ←— MAU if (F = M)<br>(V[01]+VIMOFFS)[UAF] ←— DSU if (F = D)<br>(V[01]+VIMOFFS)[UAF] ←— None if (F = N) |

FIG. 4A functionA: /— 400

```
402— lv.p v0, 0, 2      !load VLIW 0 with the next 2 instructions
       instr1  ⎫
               ⎬ 404
       instr2  ⎭
412— lv.p v0, 1, 3      !load VLIW 1 with the next 3 instructions
       instr3  ⎫
       instr4  ⎬ 414
       instr5  ⎭
420— xv.p v0, 0, e = AM    !execute VLIW 0, enabling units A and M
422— xv.p v0, 1, e = AMS   !execute VLIW 1, enabling units A, M and S
     ret
```

```
functionA':
xv.p v0, 0, e = AM     !execute VLIW 0, enabling units A and M
xv.p v0, 1, e = AMS    !execute VLIW 1, enabling units A, M and S
ret
```

510-0: Program start 511-1: loop 10 times
512-     executive VLIW a 513-     if condition then 514-2:     executive VLIW b 515-3:   else
516-       execute VLIW c
         end if
517-4: end loop 518-5: Program end

FIG. 10

```
1001- done: = false
1002- while not done do{
1003-    done: = true;
1004-    BestImprovement: = 0;
1005-    for each Lvi from LVisit do {
1006-        [NewState, improvement]: = MoveUp(Lvi, CurrentState);
1007-        if improvement > BestImprovement then {
1008-   BestState: = NewState;
1009-            BestImprovement: = improvement;
1010-            done: = false;
        }
    }
1011- if not done then {
1012-        CurrentState: = BestState;
    }
}
```

METHODS AND APPARATUS FOR INDIRECT VLIW MEMORY ALLOCATION

The present invention claims the benefit of U.S. Provisional Application Ser. No. 60/212,987 entitled "Methods and Apparatus for Indirect VLIW Memory Allocation" filed Jun. 21, 2000 which is incorporated by reference herein in its entirety.

FIELD OF INVENTION

The present invention relates generally to improved techniques for allocation of VLIWs in an array processor containing distributed indirectly accessed VLIW storage units, and more particularly to advantageous techniques for indirect VLIW memory allocation applicable to the manifold array (ManArray) multiprocessor digital signal processor (DSP).

BACKGROUND OF THE INVENTION

The ManArray processor uses a very long instruction word (VLIW) architecture as a means to exploit instruction-level parallelism in an application program. In a VLIW processor, multiple execution units can operate in parallel and the execution units are directly controlled by corresponding instruction fields in the VLIW. Each field can contain a short instruction word (SIW) or native instruction to be executed on a specific unit concurrently with the instructions in other fields, thus achieving high performance. One of the drawbacks associated with many prior art VLIW processor architectures is that they are not scalable. VLIW processors require wide busses connecting instruction memory and execution units. These instruction busses must have the width of the VLIW to transport VLIW contents from instruction memory to the execution units. Consequently, as a VLIW is increased in width the instruction bus and program storage increases commensurately. Bus width can be a significant problem in multiprocessor architectures.

Indirect VLIW is the solution employed for the BOPS ManArray digital signal multiprocessor family. It achieves the high performance afforded by executing multiple instructions packed in a very long instruction word (VLIW) and relaxes the requirements for the very wide instruction busses generally required. With indirect VLIW, the usual SIW size in program memory and the SIW bus width is maintained, at the expense of an additional small VLIW instruction memory (VIM) located near the execution units and the overhead to prepare the contents of VIM prior to execution. In essence, VIM acts like a programmer-controlled instruction cache. The VLIW instructions are loaded into the VIM using load VLIW instructions (LV) which consist of a delimiter instruction, the LV, followed by the instructions to be loaded into the VIM at a specific VIM address.

Another advantage of the indirect VLIW approach is the fact that code that uses non-overlapping execution units can be compressed and folded into the same VLIW memory address containing another VLIW instruction. Thus, indirect VLIW not only avoids the explicit storage of non-operational place-holders (nop instructions), but also enables code compression by storing more than one non-overlapping VLIW in the same VIM line.

When an application requires more VLIW instructions than the VIM size, one has to decide which VIM line and at which time a VLIW instruction is loaded into it. This decision is referred to as VIM allocation and requires the relocation of LV statements in application code. The need for VIM allocation and placement of LV statements arises in all back-end compiler tools that generate VLIW code, as well as hand-written assembly code. Code generators in compilers and assembly programmers in large software projects, only have a local or limited view of the whole program. Consequently, it is a difficult problem to know the requirements of the whole application program in order to efficiently allocate VLIWs in the VIM.

SUMMARY OF THE INVENTION

Since the VIM is reprogrammable, the present invention addresses an approach in which a small VIM size may be used even when an application demands a number of VLIWs larger than can be fit into the physical VIM size used in a particular ManArray processor. With a fixed VIM size, load VIM latency, and knowledge of an application's requirements, the load VLIW VIM management instructions can be distributed appropriately in the application code.

In one aspect of the present invention, a process and a set of heuristics are described to perform allocation of the special instruction memory where indirect very long instruction words (VLIW's) are stored for the ManArray family of multiprocessor digital signal processors. This work minimizes the cost of pre-initializing the contents of the VLIW memory prior to VLIW usage in the application code. The tool described here can handle multiple independent indirect VLIWs in the same VIM line. Further, this tool applies global optimizations that can be advantageously used on any compiler that generates indirect VLIW code.

These and other features, aspects and advantages of the invention will be apparent to those skilled in the art from the following detailed description taken together with the accompanying drawings.

BRIEF DESCRIPTION OF THE DRAWINGS

FIG. 2A illustrates a load VLIW (LV) instruction encoding;

FIG. 2B illustrates a load VLIW (LV) instruction syntax and operation description;

FIG. 3A illustrates an eXecute VLIW (XV) instruction encoding;

FIG. 3B illustrates an eXecute VLIW (XV) instruction syntax and operation description;

FIG. 4A illustrates a program section with load iVLIW (LV) and eXecute iVLIW (XV) instructions;

FIG. 4B illustrates the program section of FIG. 4A after the load iVLIWs (LVs) have been relocated in accordance with the present invention;

FIG. 10 illustrates a greedy LV relocation process in accordance with the present invention.

DETAILED DESCRIPTION

Figure 1:
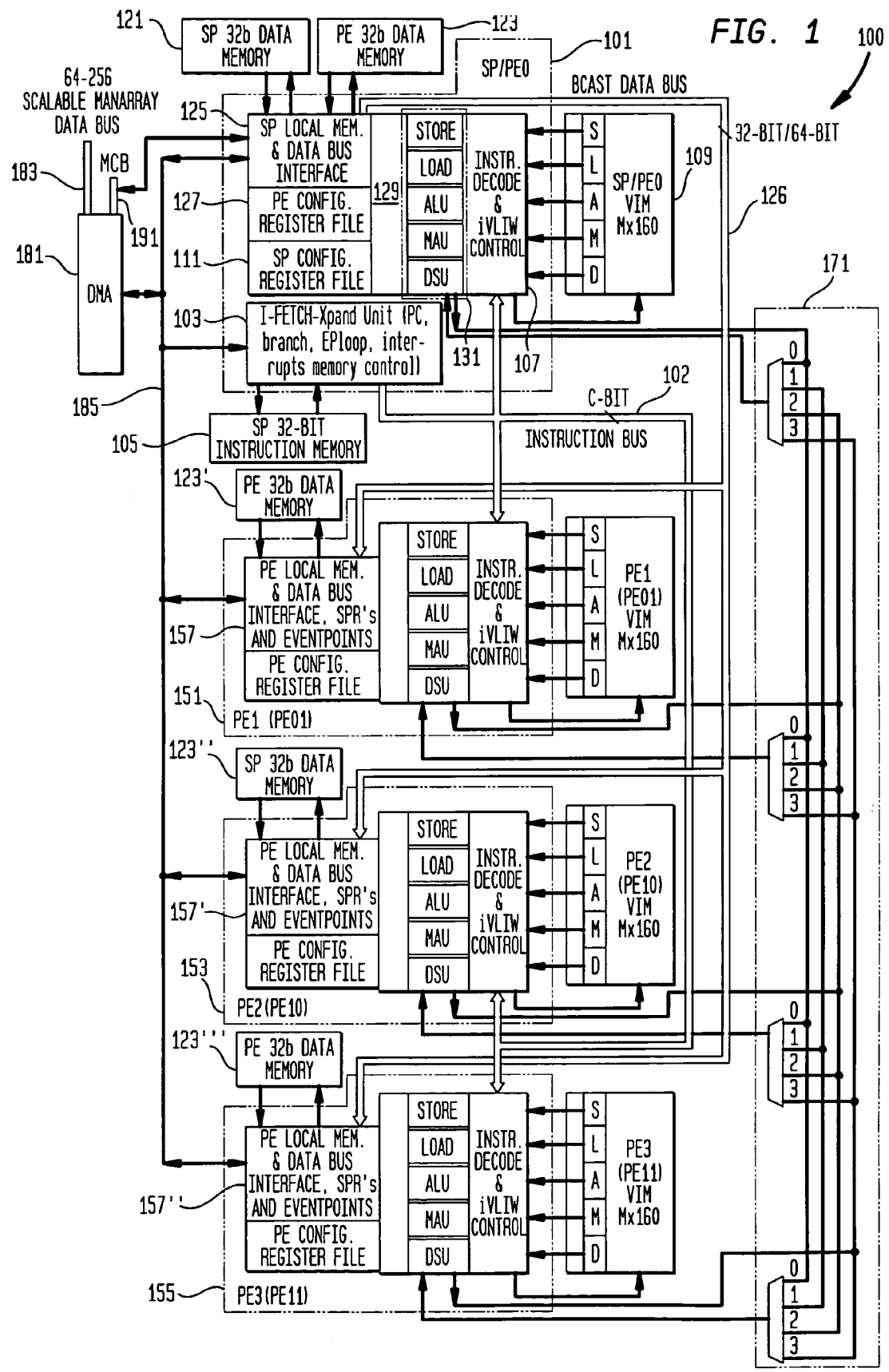
FIG. 1 illustrates a ManArray 2×2 iVLIW processor which may be suitably employed with this invention.

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, U.S. patent application Ser. No. 09/169,256 filed Oct. 9, 1998, now U.S. Pat. No. 6,167,501, U.S. patent application Ser. No. 09/169,072 filed Oct. 9, 1998, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,173,389, U.S. patent application Ser. No. 09/215,081 filed Dec. 18, 1998, now U.S. Pat. No. 6,101,592, U.S. patent application Ser. No. 09/228,374 filed Jan. 12, 1999 now U.S. Pat. No. 6,216,223, U.S. patent application Ser. No. 09/238,446 filed Jan. 28, 1999, U.S. patent application Ser. No. 09/267,570 filed Mar. 12, 1999, U.S. patent application Ser. No. 09/337,839 filed Jun. 22, 1999, U.S. patent application Ser. No. 09/350,191 filed Jul. 9, 1999, U.S. patent application Ser. No. 09/422,015 filed Oct. 21, 1999 entitled "Methods and Apparatus for Abbreviated Instruction and Configurable Processor Architecture", U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", U.S. patent application Ser. No. 09/472,372 filed Dec. 23, 1999 entitled "Methods and Apparatus for Providing Direct Memory Access Control", U.S. patent application Ser. No. 09/596,103 entitled "Methods and Apparatus for Data Dependent Address Operations and Efficient Variable Length Code Decoding in a VLIW Processor" filed Jun. 16, 2000, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,564 entitled "Methods and Apparatus for Initiating and Resynchronizing Multi-Cycle SIMD Instructions" filed Jun. 21, 2000, U.S. patent application Ser. No. 09/598,566 entitled "Methods and Apparatus for Generalized Event Detection and Action Specification in a Processor" filed Jun. 21, 2000, and U.S. patent application Ser. No. 09/598,084 entitled "Methods and Apparatus for Establishing Port Priority Functions in a VLIW Processor" filed Jun. 21, 2000, U.S. patent application Ser. No. 09/599,980 entitled "Methods and Apparatus for Parallel Processing Utilizing a Manifold Array (ManArray) Architecture and Instruction Syntax" filed Jun. 22, 2000, U.S. patent application Ser. No. 09/791,940 entitled "Methods and Apparatus for Providing Bit-Reversal and Multicast Functions Utilizing DMA Controller" filed Feb. 23, 2001, U.S. patent application Ser. No. 09/792,819 entitled "Methods and Apparatus for Flexible Strength Coprocessing Interface" filed Feb. 23, 2001, U.S. patent application Ser. No. 09/792,256 entitled "Methods and Apparatus for Scalable Array Processor Interrupt Detection and Response" filed Feb. 23, 2001, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" filed Nov. 12, 1999, and Provisional Application Ser. No. 60/171,911 entitled "Methods and Apparatus for DMA Loading of Very Long Instruction Word Memory" filed Dec. 23, 1999, Provisional Application Ser. No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, Provisional Application Ser. No. 60/203,629 entitled "Methods and Apparatus for Power Control in a Scalable Array of Processor Elements" filed May 12, 2000, Provisional Application Ser. No. 60/241,940 entitled "Methods and Apparatus for Efficient Vocoder Implementations" filed Oct. 20, 2000, Provisional Application Ser. No. 60/251,072 entitled "Methods and Apparatus for Providing Improved Physical Designs and Routing with Reduced Capacitive Power Dissipation" filed Dec. 4, 2000, Provisional Application Ser. No. 60/281,523 entitled "Methods and Apparatus for Generating Functional Test Programs by Traversing a Finite State Model of Instruction Set Architecture" filed Apr. 4, 2001, Provisional Application Ser. No. 60/283,582 entitled "Methods and Apparatus for Automated Generation of Abbreviated Instruction Set and Configurable Processor Architecture" filed Apr. 27, 2001, Provisional Application Ser. No. 60/288,965 entitled "Methods and Apparatus for Removing Compression Artifacts in Video Sequences" filed May 4, 2001, Provisional Application Ser. No. 60/140,245 entitled "Methods and Apparatus for Generalized Event Detection and Action Specification in a Processor for Providing Embedded Exception Handling" filed Jun. 15, 2001, Provisional Application Ser. No. 60/289,624 entitled "Modified Single Ended Write Approach For Multiple Write-Port Register Files" filed Jun. 15, 2001, and Provisional Application Ser. No. 60/298,695 entitled "Methods and Apparatus for Self Tracking Read Delay Write for Low Power Memory" filed Jun. 15, 2001, all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown in FIG. 1 contains a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 can be also labeled with their matrix positions as shown in parentheses for PE0 (PE00) 101, PE1 (PE01)151, PE2 (PE10) 153, and PE3 (PE11) 155. The SP/PE0 101 contains an instruction fetch (I-fetch) controller 103 to allow the fetching of short instruction words (SIW), also known as native instructions, or abbreviated-instruction words from a B-bit instruction memory 105, where B is determined by the application instruction-abbreviation process to be a reduced number of bits representing ManArray native instructions. If an instruction abbreviation apparatus is not used, then B is determined by the SIW format. The fetch controller 103 provides the typical functions needed in a programmable processor, such as a program counter (PC), a branch capability, eventpoint loop operations, see U.S. Provisional Application Ser. No. 60/140,245 entitled "Methods and Apparatus for Generalized Event Detection and Action Specification in a Processor" filed Jun. 21, 1999 for further eventpoint loop operation details, and support for interrupts. It also provides the instruction memory control which could include an instruction cache if needed by an application. In addition, the I-fetch controller 103 controls the dispatch of instruction words and instruction control information to the other PEs in the system by means of a C-bit instruction bus 102, which may include additional control signals as required by a particular implementation. C is determined by the implementation. For the exemplary ManArray coprocessor shown in FIG. 1, C=32-bits.

In the exemplary system 100, common elements are used throughout to simplify the explanation, though actual implementations are not so limited. For example, the execution units 131 in the combined SP/PE0 101 can be separated into a set of execution units optimized for the control function, for example, fixed point execution units in the SP, and the PE0, as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D). The basic concept of loading the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common design PE configurable register file 127 which is described in further detail in U.S. patent application Ser. No. 09/169,255 entitled "Method and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common design physical data memory units 123', 123", and 123''' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. Pat. No. 6,023,753 entitled "Manifold Array Processor", U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control".

The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

The present invention describes the methods used for VIM allocation and relocation of load VLIW statements taking into consideration the ManArray architecture, the VIM size of a specific ManArray processor core, the load VLIW latency, and knowledge of a program's requirements. The ManArray instruction set architecture contains two instructions related to VLIWs, one that modifies the contents of a VIM line and one that executes a VIM line. These are the load VLIW (LV) and the eXecute VLIW (XV), respectively.

FIG. 2A illustrates the instruction set encoding 200 for the LV. FIG. 2B illustrates the LV's syntax and operation description 210. The LV is used to load individual instruction slots of the specified SP or PE VLIW memory (VIM). The VIM address is computed as the sum of a base VIM address register Vb (V0 or V1) plus an unsigned 8-bit offset VIMOFFS. The VIM address must be in the valid range for the hardware configuration otherwise the operation of this instruction is undefined. Any combination of individual instruction slots may be disabled via the disable slot parameter 'D={SLAMD}', where S=Store Unit (SU), L=Load Unit (LU), A=Arithmetic Logic Unit (ALU), M=Multiply-Accumulate Unit (MAU) and D=Data Select Unit (DSU). A blank 'D=' parameter does not disable any slots. An instruction loaded into a slot marked by the disable slot parameter remains disabled when loaded. The number of instructions to load are specified via the InstrCnt parameter. For the present implementations, valid values are 1–5. The next InstrCnt(1–5) instructions following LV are loaded into the specified VIM. An instruction loaded into a slot not marked by the disable slot parameter above is enabled when loaded. The unit affecting flags (UAF) parameter 'F=[AMDN]' selects which arithmetic unit (A=ALU, M=MAU, D=DSU) is allowed to set condition flags for the specified VIM when it is executed. 'F=N' specifies that none of the arithmetic units are allowed to set condition flags. A blank 'F=' selects the ALU instruction slot. No arithmetic flags are affected by the LV execution and the instruction executes in a number of cycles equal to one plus the number of instructions loaded (instrCnt).

FIG. 3A illustrates an instruction set encoding 300 for the XV instruction. FIG. 3B illustrates the XV's syntax and operation description 310. The XV is used to execute an indirect VLIW (iVLIW). The iVLIWs that are available for execution by the XV instruction are stored at individual addresses of the specified SP or PE VLIW memory (VIM). The VIM address is computed as the sum of a base VIM address register Vb (V0 or V1) plus an unsigned 8-bit offset VIMOFFS. The VIM address must be in the valid range for the hardware configuration otherwise the operation of this instruction is undefined. Any combination of individual instruction slots may be executed via the execute slot parameter 'E={SLAMD}', where S=Store Unit (SU), L=Load Unit (LU), A=Arithmetic Logic Unit (ALU), M=Multiply-Accumulate Unit (MAU), D=Data Select Unit (DSU). A blank 'E=' parameter does not execute any slots. The unit affecting flags (UAF) parameter 'F=[AMDN]' overrides the UAF specified for the VLIW when it was loaded via the LV instruction. The override selects which arithmetic instruction slot (A=ALU, M=MAU, D=DSU) or none (N=NONE) is allowed to set condition flags for this execution of the VLIW. The override does not affect the UAF setting specified via the LV instruction. A blank 'F=' selects the UAF specified when the VLIW was loaded. Conditions flags are set by the individual native instruction in the slot specified by the setting of the "F=–" parameter from the original LV instruction or as overridden by a "F=[AMD]" parameter in the XV instruction. Condition flags are not affected when "F=N". The XV instruction executes in a single cycle.

Among its other aspects, the present invention adapts, generalizes and extends the concept of global code motion as described, for example, by Knoop et al., Optimal code motion: theory and practice, *ACM Transactions on Programming Languages and Systems*, Vol. 16, Issue 4, Pages 1117–1155, 1994, to include the highly novel ideas of VIM allocation and LV relocation.

In order to better understand the novel approach to VLIW allocation in an indirect VLIW processor of the present invention, a different problem concerning register allocation is first addressed. Register allocation is the scheduling problem of assigning machine registers (physical registers) to program variables (soft registers). Program variables must be loaded into machine registers because in many computer architectures, the processor execution units can only read and write their operands in registers. Since a processor has a small number of registers, and programs can contain a lot of variables, many variables have to share the same physical register when their lifetimes do not overlap, thus the need for register allocation. The term "lifetime" refers to a program relative measure of time that a variable is actively used requiring its storage remain in a physical register of the processor, see, for example Appel, *Modern Compiler Implementation in ML. Cambridge* University Press, pp. 211–222 and 228–229, 1998.

In a similar way, a group of instructions called a VLIW that can be executed simultaneously, has to be loaded into a VIM line by use of an LV instruction. Then, the contents of the VIM line can be executed multiple times by use of the XV instruction in the preferred ManArray architecture. Thus, VLIW instructions have to be allocated in VIM, loaded by an LV instruction to be used by the corresponding XV instruction. Two VLIW instructions can share the same VIM line when their lifetimes do not overlap or they use non-overlapping execution units. The lifetime of a VLIW is defined herein to extend from the node containing the LV that sets up the VLIW into a VIM line, till the node that uses the contents of the same VIM line with an XV for the last time in the program execution. The VLIW lifetime represents the program time the VLIW needs to remain in the VIM. It is impossible to calculate the lifetime of a VLIW in temporal terms (from cycle x to cycle y). Instead, according to the present invention, a static analysis of the program is performed and the lifetime of a VLIW is defined in spatial terms with respect to the control flow graph of the program.

To compute the lifetime of a VLIW established by an LV statement, in liveness analysis, a control flow graph (CFG) of a program is first calculated. Every node in the CFG is a basic block of the program and every edge is a jump or a call from one basic block to another. From the CFG, the VLIW flow equations are solved and a VLIW flow graph (VFG) is established. With the VFG, the VLIW interference can be determined and thus, the appropriate VLIW allocation to VIM can ultimately be determined.

iVLIW Initialization Scheduling

The indirect VLIW memory (VIM) is a critical resource for the ManArray DSP, just like other computer resources, for instance execution units and registers. iVLIW use permits faster program execution of sequences of instructions that can be operated in parallel and are repeated often. The penalty is a small overhead for setting up the corresponding VIM prior to use.

The VIM setup for XVs can be lifted up in the control flow graph so that program sections that execute often do not have to re-initialize their VIM at every entry. However, the size of VIM is limited, so for programs using a large number of VLIWs, one cannot move all VIM initializations at an early set-up phase of a program execution, but rather must allocate VIM use and distribute its initializations based upon the liveness analysis and program requirements.

The problem of VIM allocation can be abstracted as follows: given the control flow graph (CFG) of a program, find the corresponding VLIW flow graph (VFG); from it build the VLIW interference graph (VIG); and color it. While the VIG can be colored, lift up the LV instructions on the CFG to program blocks that are executed fewer times.

More specifically, the control flow graph is a directed graph G(N,E) where node N is a function or program block and edge $e(n_1,n_2)$ from E is a jump or a function call from basic block $n_1$ to $n_2$. The graph contains a special program-start node (with no parents) and an end node (with no descendants).

Both nodes and edges can be augmented with run-time profiling data: integers that indicate how many times a block is executed, and how many times an edge (call or jump) is followed. It is also known how many cycles it takes to execute each program block once.

Each block/function contains the loading and execution instructions of the iVLIWs it needs for best performance. See FIG. 4A for an example of a program section, functionA 400, containing LV and XV instructions.

In this simplified example, LV instructions 402 and 412 load a set of instructions, 404 and 414, respectively, at the VIM line denoted by the first and second argument of the LV instructions. For example, the instructions 404 are loaded into the VIM address specified by V0+0, the first and second arguments of LV instruction 402. XV instructions 420 and 422 execute the contents of the VIM line that corresponds to their first two arguments. For example, XV instruction 420 executes the VLIW located in VIM at address V0+0, the first and second arguments of XV instruction 420. If functions 400 is executed many times, as in a program loop, the load iVLIW instructions 404 for LV 402 and instructions 414 for LV 412 can be moved to all the nodes that call functionA 400 because it is invariant between different function evocations. FIG. 4B depicts high performance XV execution code 450 corresponding to 420 and 422 of FIG. 4A that is repeated due to the split coding that results from moving the setup LVs to the caller node(s). As a result, the time for running functionA 400 once, using FIG. 4B code, is reduced by 7 cycles and the time for running the callers of functionA 400 once increases by 7 cycles.

If the code 450 of FIG. 4B functionsA' is executed a proportional number of times more than its callers as in a loop, a faster running program is obtained. Obviously, it is not practical to push the load iVLIW instructions up all the way to the starting program block for a minimum execution time, since the number of iVLIW slots is bounded. Consequently, the load iVLIW instructions are distributed in such a way that at no time during the program execution, the number of VLIWs allocated to VIM exceeds the total VIM size.

In order to allocate VIM lines to VLIW instructions used in a program, the liveness of each and every VLIW instruction used in a program is found. The life of a VLIW is defined to be the interval between the time a VLIW is defined via an LV instruction, until the time it is executed for the last time with an XV instruction. In a presently preferred embodiment, the liveness analysis is performed as follows. First, the control flow graph is calculated. This graph is a graph with nodes representing the basic program blocks. The graph identifies where program control enters at the top and it is guaranteed to exit at the bottom of a basic block. Connecting the nodes are edges denoting jumps and calls from one block to the other. The control flow graph is provided by a compiler, or it can be established by parsing specially annotated assembly code, where annotations provide the complete list of targets for all indirect control instructions, such as indirect jumps, EPLOOP boundaries, etc. From the control flow graph, the VLIW flow graph is then calculated by solving the VLIW flow equations.

The VLIW flow equations are defined as follows. By architecture definition, an LV instruction defines a VLIW and an XV instruction uses a VLIW. For every node of the control flow graph, there is a set D of the VLIWs that are defined in this node, and a set U of the VLIWs that are used in this node. The goal is to extract the sets I and O of live-in and live-out VLIWs respectively, at every node. The live-in VLIWs for a node "n" is defined by set $I_n$, the set of VLIWs that are used in node "n" together with the VLIWs that are needed in successor nodes to this node except the VLIWs that are defined in node "n". The live-out VLIWs for a node "n" is defined by set $O_n$, the union of the live-in sets for all successor nodes to node "n". The sets I and O are determined by solving the VLIW liveness equations:

$I_n = U_n \cup (O_n - D_n)$, and $O_n = \cup_{s \text{ in } succ(n)} I_s$.

The set $I_n$ of live-in VLIWs at node "n", is the union of the set $U_n$ of the VLIWs that are used in "n" and $O_n$ the VLIWs that live-out of "n" except $D_n$ the VLIWs that are defined in "n". The live-out VLIWs of node "n" are all the VLIWs that belong to the live-in sets of the successor nodes of "n". The notation $\cup_{s \text{ in } succ(n)} I_s$ denotes the union of all sets $I_s$ where s is a successor node to node n.

The control flow graph with the live-in and live-out sets for each of the nodes comprises the VLIW flow graph. The VLIWs that belong to the live-out set of a node, cannot be assigned to occupy the same VIM line because they interfere with each-other. To determine how to allocate the VIM lines, an interference graph is built as described below. Every node of the interference graph corresponds to a VLIW. If two VLIWs belong to the live-out set of the same node of the VLIW flow graph, then an undirected edge is inserted in the interference graph connecting the corresponding VLIW nodes. A successful allocation of VIM lines to VLIWs corresponds to coloring the interference graph nodes in such a way that adjacent interference nodes are colored in different colors. Each color corresponds to a different VIM line.

The above solution bears some similarities to whole program register allocation. A significant difference from register allocation is that the lifetime of a variable is imposed by the program. For VIM allocation, we can shorten the life of a VLIW by placing the initialization LV statement adjacently prior to the use of its corresponding XV statement.

Two or more VLIW instructions with contents that require execution units that do not overlap will be referred to herein, as non-overlapping VLIWs. With the VLIW interference graph, it is easy to merge non-overlapping VLIW instructions, so as to share the same VIM line, thus possibly reducing the required size of VIM by a program. In principle, two non-overlapping VLIWs can be merged, even when their life-times interfere, because they require different execution units. The new VLIW is the union of the previous two, thus the same VIM line is used for both. The resulting VLIW interference graph has the nodes of the two original VLIWs coalesced in a new node, with edges the union of the edges of the replaced nodes. However, the resulting VLIW interference graph might not be colorable with as many or fewer colors as the original graph because the new node has at least as many edges as the nodes it replaces. It is possible that a graph that was colorable with k colors prior to merging will become uncolorable with k colors after merging two nodes. It is our intention to only merge non-overlapping VLIWs whenever the colorability of the resulting VLIW interference graph does not worsen. This problem is NP-complete and only heuristics are available to determine "safe" merging. The heuristics from register allocation and move-instruction coalescing are utilized as discussed below.

In a graph, let the degree of a node be defined as the number of edges a node has. On a k-colorable graph, a node is said to have a significant degree, if it is adjacent to k or more nodes. This definition is utilized to describe:

(1) the Briggs heuristic: Two nodes can be merged, when the resulting node has fewer than k neighbors of significant degree. The graph after the merge remains k colorable, if the original graph was k colorable.

(2) the George heuristic: Nodes a and be can be merged, if each adjacent node to a is either adjacent to b too, or it has fewer than k neighbors of significant degree.

The present invention is not limited to the above heuristics. Any other register allocation and move-instruction coalescing heuristics are also applicable. Such coalescing heuristics have been developed in other contexts to eliminate unnecessary move instructions, however, in the present invention the same heuristics are used in novel and advantageous ways to reduce the VIM requirements of a program. One of the novel ways is that the coalesced VIM address holds two or more VLIWs. Other aspects are illustrated by the preceding and following discussion.

Figures 5, 6:
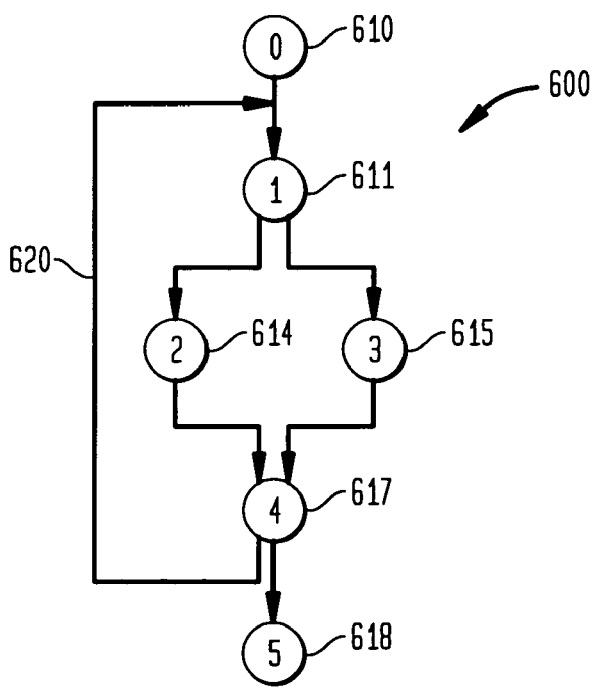
FIG. 5 illustrates a simplified program containing multiple XV usage requiring the pre-initialization of VIM for each XV.
FIG. 6 illustrates a control flow graph for the simple program of FIG. 5.

FIG. 5 shows a simple program 500 written in pseudo-programming high-level language. The program consists of a single loop initiated by a statement 511. The body of the loop contains an unconditional statement 512 and a conditional statement 513 with two alternatives, statements 514 and 516. The program 500 specifies the execution of up to three VLIW instructions labeled as a, b, and c in statements 512, 514 and 516, respectively. Program statements 510 and 518 should be considered as the program prolog and epilog that bootstrap the program execution and return control to the operating system respectively. This present invention teaches how to optimally allocate the VIM lines to store the VLIWs a, b, and c and how to determine the positions of the LV instructions so that redundant loading of VLIWs is minimized. For this program, a very simplified VIM is assumed that can only hold up to two different VLIWs.

FIG. 6 shows a control flow graph 600 for the program 500 of FIG. 5. The nodes of the graph 600 correspond to the basic blocks of the program, in this case simple pseudo-programming statements, in the program listing 500 of FIG. 5. For example, node 611 labeled 1 corresponds to basic block 1 of FIG. 5 that contains pseudo-programming instruction 511 the entry point of the loop, instruction 512 the unconditional execution of VLIW a, and instruction 513 the evaluation of the conditional statement guard to determine whether control will go to node 614 labeled 2 or node 615 labeled 3. Note the back edge 620 from node 617 labeled 4 to node 611, labeled 1 is due to the loop defined by statements 511 and 517.

Figure 7:
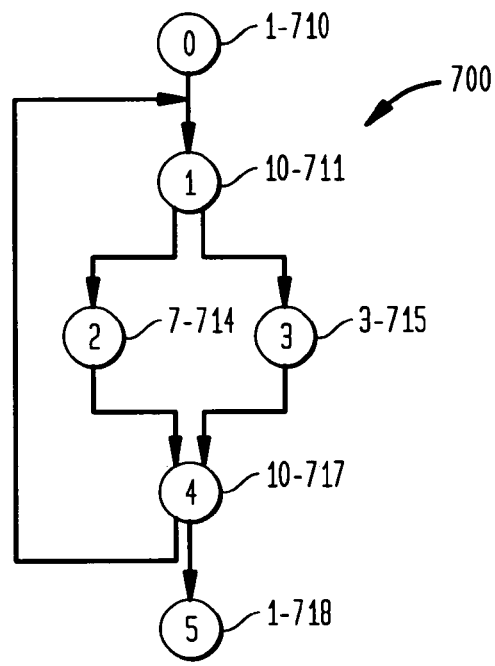
FIG. 7 illustrates the control flow graph of FIG. 6 annotated with profile data in accordance with the present invention.

FIG. 7 shows control flow graph 700 corresponding to the control flow graph 600 of FIG. 6, but annotated with profile data 710 to 718 which indicates the number of times each node has been executed. For example, the given set of input data used to produce this profiling, the condition expression of statement 513 resulted to true 7 times and to false 3 times during the 10 loop iterations.

Figure 8:
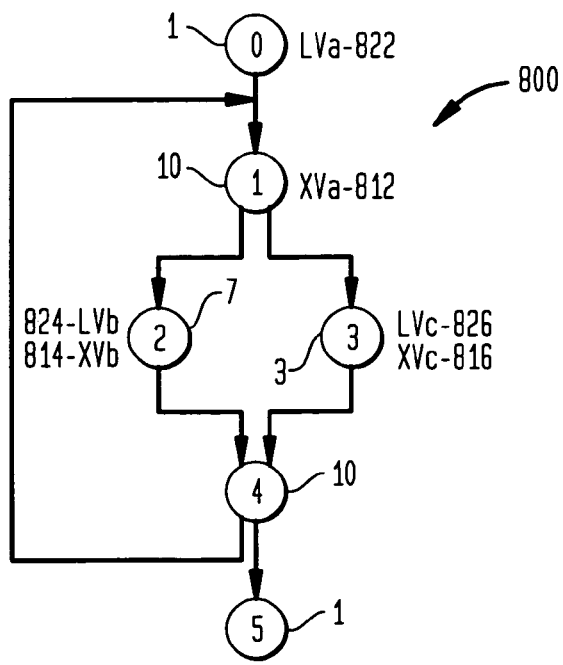
FIG. 8 illustrates the control flow graph of FIG. 7 with the required XVs and with the allocated LV VIM pre-initialization based upon the profile data of FIG. 5 in accordance with the present invention.

FIG. 8 shows a VLIW flow graph 800 corresponding to the control flow graph 700 of FIG. 7 but with the addition of the position of the XV instructions 512, 514 and 516 in nodes 1, 2, and 3 indicated as entities 812, 814 and 816, respectively. VLIW flow graph 800 also displays an optimal placement of the corresponding LV instructions 822, 824 and 826 to nodes 0, 2 and 3 for a VIM with 2 lines. It is noted that if LV a 822 is placed together with its corresponding XV a 812, the LV statement will be executed 10 times instead of just once, thus increasing the total latency of the loop.

Figure 9:
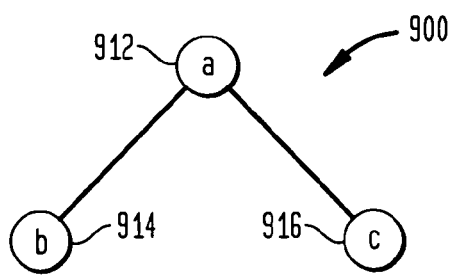
FIG. 9 illustrates a VLIW interference graph in accordance with the present invention.

FIG. 9 displays a VLIW interference graph 900 for the VIM allocation solution shown in FIG. 8. The lifetime of VLIW b 914 used in XV instruction 814 required by statement 514 and VLIW c 916 of XV instruction 816 required by statement 516 partially overlaps with the lifetime of VLIW a 912 because VLIW a 912 is set-up outside of the loop 611–617. VLIW b 914 and VLIW c 916 do not conflict with each other because they are defined and used in different branches 514 and 516 of the conditional statement 513–516. Nodes corresponding to VLIWs with overlapping lifetimes are connected with an edge denoting the interference, and the same VIM line cannot be assigned to VLIWs that interfere with each other. One approach to VIM allocation is accomplished by "coloring" the nodes of the interference graph of FIG. 9 with 2 colors, so that nodes connected with an edge do not share the same color. The interference graph 900 of FIG. 9 is colorable with 2 colors, thereby assigning VIM line zero to VLIW a 912, as one color, and VIM line 1 to VLIW b 914 and VLIW c 916, as the second color to both nodes.

With respect to given profiling data, an optimal placement of VIM initialization instructions involves calculating the total number of times each LV instruction is executed and moving LV instructions to a program region where they are executed fewer times. This movement may be successfully accomplished utilizing a greedy optimization algorithm that at each iteration moves the LV instruction that has the highest count of executions to a basic block that is higher in the control flow graph, with respect to call and jump edges, with a smaller count of executions. With such a move, the interference graph changes, it is therefore necessary to check whether it is still possible to allocate a VLIW instruction memory (VIM) address for each VLIW.

The process 1000 shown in FIG. 10 is a steepest descent greedy LV relocation optimization process that iterates until no further improvement can be found. At every iteration, an LV instruction is chosen to be moved in step 1005. The movement criterion is the frequency of executions. Then, the LV is placed in a basic block that is closer to the program start node and the following conditions are met: the execution frequency of the new node is lower and the VIM allocation succeeds in assigning a VIM line without exceeding the maximum number of VIM lines, MaxVIM, is set by the hardware or application constraints. The process terminates when no further improvement can be achieved because either all LV statements have reached the program start basic block, or because any movement of an LV statement to a node with lower frequency results to an interference graph that cannot be colored with MaxVIM colors.

Specifically, process 1000 utilizes the flag variable "done" in steps 1001, 1002 1003, 1010 and 1011, to represent whether a full sweep across all LV instructions in step 1005 has completed without being able to improve the total number of cycles spent by the execution of LV statements. Variable "BestImprovement" in steps 1004, 1007 and 1009 holds the reduction of cycles achieved by the move of an LV instruction from its current basic block node, to a basic block closer to the program start basic block. "Lvlist" in step 1005 is the global variable holding the list of pairs ("n", "v") denoting that there exist an LV instruction on node "n" loading VLIW "v". "CurrentState" and "NewState" in steps 1006, 1008 and 1012 are variables holding mappings of VLIWs to nodes. Software procedure MoveUp in step 1006 takes an LV instruction denoted by variable "Lvi" and the current state of LVs denoted by variable "CurrentState" and attempts to move "Lvi" to nodes higher in the control flow graph and reallocate the VIM according to the new position. If successful, the procedure MoveUp updates the global variable "Lvlist" and returns the new state of LV statements together with the reduction in execution cycles. Otherwise, it returns "NewState" assigned to "CurrentState" and improvement assigned to 0. Whenever "improvement" exceeds "BestImprovement" in step 1007, the values of the best improvement found in the current sweep "NewState" and "improvement" are captured by the variables "BestState" and "BestImprovement" in steps 1008 and 1009, respectively.

The starting state of the process 1000 can be one where all LV instructions are adjacently prior to their corresponding XV instructions. It is noted that this is usually the state returned by a compiler packing simple instructions into VLIWs. Alternatively, any other placement such as the state found in hand-written assembly programs can be the starting state. A heuristic allows a start from a state that can be much better off than an initial state where LV definitions are adjacent to XV uses and the VLIWs are VIM allocatable. One exemplary heuristic is the following: find the highest number C of LVs in the same basic block. Then, allocate the MaxVIM-C LVs of the highest frequency blocks and move them all for preloading to the program starting block. Then, use the rest C VIM lines for loading and use of the remaining unallocated LVs. This starting state is allocatable since it preassigns all VLIWs to VIM, but also is no worse than the elementary starting point, since MaxVIM-C LV instructions from the highest frequency basic blocks are executed just once.

While the present invention has been disclosed in the context of various aspects of presently preferred embodiments, it will be recognized that the invention may be suitably applied to other environments and applications consistent with the claims which follow.

We claim:

1. A computer implemented method of indirect very long instruction word (VLIW) instruction memory (VIM) allocation comprising the steps of:
   identifying a plurality of VLIW instructions in an input source program;
   determining a lifetime of each of said plurality of VLIW instructions, the lifetime of a VLIW instruction including the interval of time between loading the VLIW instruction to VIM and the last time the VLIW instruction is executed; and
   allocating at least some of the plurality of VLIW instructions to VIM based on the lifetime of said plurality of VLIW instructions.

2. The method of claim 1 wherein the step of determining the lifetime of each of said plurality of VLIW instructions further comprises the steps of:
   determining a control flow graph for the input source program containing said plurality of VLIW instructions;
   determining a VLIW flow graph for said plurality of VLIW instructions; and
   determining a VLIW interference graph.

3. The method of claim 2 wherein the step of determining the VLIW flow graph further comprises the step of:
   solving VLIW flow equations.

4. The method of claim 2 wherein the control flow graph includes:
   a plurality of nodes which correspond to basic blocks of the VLIW instructions; and
   a plurality of edges, wherein each edge corresponds to a jump or a call from a given basic block to another basic block.

5. The method of claim 4 wherein the flow control graph at each of said plurality of nodes includes:
   at least one VLIW instruction defined by the node; and
   at least one VLIW instruction used by the node.

6. The method of claim 5 further comprising the step of:
   determining live-in sets and live-out sets for each of said plurality of nodes.

7. The method of claim 6 wherein the VLIW flow graph comprises the control flow graph and the live-in sets and live-out sets for each of said plurality of nodes.

8. The method of claim 7 wherein the step of allocating VIM further includes the step of:
   determining an interference graph in which every node of the interference graph corresponds to one of said plurality of VLIW instructions.

9. The method of claim 8 wherein the VIM comprises a plurality of VIM lines, and the step of determining an interference graph further comprises the steps:
   inserting an undirected edge into the interference graph between two VLIW nodes if the two VLIW instructions belong to a live-out set of the same node of the VLIW flow graph; and
   coloring the interference graph nodes such that adjacent interference nodes are colored in different colors and each color corresponds to a different VIM line.

10. The method of claim 1 wherein the lifetime of a VLIW instruction is a time interval extending from when said VLIW is defined by a load VLIW instruction to when said VLIW is last executed by an execute VLIW instruction.

11. The method of claim 1 further comprising the step of:
    shortening the life of a particular VLIW by placing an initialization load VLIW (LV) statement adjacently prior to the use of its corresponding execute VLIW (XV) statement.

12. The method of claim 1 further comprising the step of:
    merging two non-overlapping VLIWs to share a common VIM line only when colorability of a resulting VLIW interference graph does not worsen as a result of said merging.

13. The method of claim 1 further comprising the step of:
    utilizing a coalescing heuristic to reduce VIM requirements of a program.

14. The method of claim 13 wherein said step of utilizing a coalescing heuristic results in a coalesced VIM address holding two or more of said plurality of VLIW instructions.

15. A computer implemented method of optimizing the execution time of a user program by reducing redundant loads of very long instruction word (VLIW) instruction memory (VIM) comprising the steps of:
    selecting a load VLIW (LV) instruction in a current node; and
    placing the LV instruction in a new node which is closer to a program start node if an execution frequency of the new node is lower than an execution frequency of the current node, and if a maximum number of VIM lines is not exceeded.

16. A computer implemented method to statically determine liveness of indirect very long instruction word (VLIW) instructions comprising the steps of:
    determining a control flow graph which includes nodes representing basic program blocks, and edges connecting the nodes which represent jumps and calls from one block to another block;
    determining a live-in set and a live-out set of VLIW instructions for each node in the control graph to define a VLIW flow graph, a live-in set for a node comprises the VLIW instructions that are used in the node, a live-out set for a node comprises a union of live-in sets of successor nodes, the determining step further including solving VLIW flow equations for the live-in set and the live-out set; and
    allocating at least some of the VLIW instructions to VLIW instruction memory based on said VLIW flow equation.

17. The method of claim 16 wherein the VLIW flow equations comprise:

$$I_n = U_n \cup (O_n - D_n); \text{ and}$$

$$O_n = \cup_{s \text{ in } succ(n)} I_s;$$

where "n" is a given node, $I_n$ is a set of live-in VLIWs at node "n", $O_n$ is a set of live-out VLIWs at node "n", $U_n$ is a set of VLIWs that are used in "n", $D_n$ is a set of VLIWs that are defined in "n", the live-out VLIWs of node "n" are all the VLIWs that belong to live-in sets of successor nodes of "n", and the notation $\cup_{s \text{ in } succ(n)} I_s$ denotes the union of all sets $I_s$ where s is a successor node to node n.

18. A computer implemented method to statically determine interference between indirect very long instruction word (VLIW) instructions from a control graph of having a plurality of nodes, the computer implemented method comprising the steps of:
   determining live-out sets for the plurality of nodes, the live-out sets and the control graph defining a VLIW flow graph;
   determining an interference graph from the VLIW flow graph, the interference graph comprising VLIW nodes in which every VLIW node of the interference graph corresponds to one VLIW instruction;
   inserting an undirected edge into the interference graph between two VLIW nodes if the two VLIW instructions belong to a live-out set of the same node of the VLIW flow graph; and
   coloring the VLIW graph nodes such that adjacent VLIW nodes are colored in different colors and each color corresponds to a different VIM line.

19. An apparatus for allocating indirect very long instruction word (VLIW) instruction memory (VIM) comprising:
   means for identifying a plurality of VLIW instructions in an input source program;
   means for determining a lifetime of each of said plurality of VLIW instructions, the lifetime of a VLIW instruction including the interval of time between loading the VLIW instruction to VIM and the last time the VLIW instruction is executed; and
   means for allocating at least some of the plurality of VLIW instructions to VIM based on the lifetime of said plurality of VLIW instructions.

20. The apparatus of claim 19 wherein the means for determining the lifetime of each of said plurality of VLIW instructions further comprises:
   means for determining a control flow graph for the input source program containing said plurality of VLIW instructions;
   means for determining a VLIW flow graph for said plurality of VLIW instructions; and
   means for determining a VLIW interference graph.

21. The apparatus of claim 20 wherein the means for determining the VLIW flow graph further comprises:
   means for solving VLIW flow equations.

22. The apparatus of claim 20 wherein the control flow graph includes:
   a plurality of nodes which correspond to basic blocks of the VLIW instructions; and
   a plurality of edges, wherein each edge corresponds to a jump or a call from a given basic block to another basic block.

23. The apparatus of claim 22 wherein the flow control graph at each of said plurality of nodes includes:
   at least one VLIW instruction defined by the node; and
   at least one VLIW instruction used by the node.

24. The apparatus of claim 23 further comprising:
   means for determining live-in sets and live-out sets for each of said plurality of nodes.

25. The apparatus of claim 24 wherein the VLIW flow graph comprises the control flow graph and the live-in sets and live-out sets for each of said plurality of nodes.

26. The apparatus of claim 25 wherein the means for allocating VIM further includes:
   means for determining an interference graph in which every node of the interference graph corresponds to one of said plurality of VLIW instructions.

27. The apparatus of claim 26 wherein the VIM comprises a plurality of VIM lines, and the means for determining an interference graph further comprises:
   means for inserting an undirected edge into the interference graph between two VLIW nodes if the two VLIW instructions belong to a live-out set of the same node of the VLIW flow graph; and
   means for coloring the interference graph nodes such that adjacent interference nodes are colored in different colors and each color corresponds to a different VIM line.

28. The apparatus of claim 19 wherein the lifetime of a VLIW instruction is a time interval extending from when said VLIW is defined by a load VLIW instruction to when said VLIW is last executed by an execute VLIW instruction.

29. The apparatus of claim 19 further comprising:
   means for merging two non-overlapping VLIWs to share a common VIM line only when colorability of a resulting VLIW interference graph does not worsen as a result of said merging.

30. The apparatus of claim 19 further comprising:
   means for utilizing a coalescing heuristic to reduce VIM requirements of a program.

31. The apparatus of claim 30 wherein said means for utilizing a coalescing heuristic produces a coalesced VIM address holding two or more of said plurality of VLIW instructions.

32. The apparatus of claim 19 further comprising:
   means for shortening the life of a particular VLIW by placing an initialization LV statement adjacently prior to the use of its corresponding XV statement.

33. An apparatus for optimizing the execution time of a user program by reducing redundant loads of very long instruction word (VLIW) instruction memory (VIM) comprising:
   means for selecting a load VIM (LV) instruction in a current node; and
   means for placing the LV instruction in a new node which is closer to a program start node if an execution frequency of the new node is lower than an execution frequency of the current node, and if a maximum number of VIM lines is not exceeded.

34. An apparatus for statically determining liveness of indirect very long instruction word (VLIW) instructions comprising:
   means for determining a control flow graph which includes nodes representing basic program blocks containing VLIW instructions, and edges connecting the nodes which represent jumps and calls from one block to another block;
   means for determining a live-in set and a live-out set of VLIW instructions for each node in the control graph to define a VLIW flow graph, a live-in set for a node comprises the VLIW instructions that are used in the node, a live-out set for a node comprises a union of live-in sets of successor nodes, the determining step further including solving VLIW flow equations for the live-in set and the live-out set; and
   means for allocating at least some of the VLIW instructions to VLIW instruction memory based on said VLIW flow equation.

35. The apparatus of claim 34 wherein the VLIW flow equations comprise:

$$I_n = U_n \cup (O_n - D_n); \text{ and}$$

$$O_n = \cup_{s \text{ in } succ(n)} I_s;$$

where "n" is a given node, $I_n$ is a set of live-in VLIWs at node "n", $O_n$ is a set of live-out VLIWs at node "n", $U_n$ is a set of VLIWs that are used in "n", Dn is a set of VLIWs that are defined in "n", the live-out VLIWs of node "n" are all the VLIWs that belong to live-in sets of successor nodes of "n", and the notation $\bigcup_{s\ in\ succ(n)} I_s$ denotes the union of all sets $I_s$ where s is a successor node to node n.

36. An apparatus statically determining interference between indirect very long instruction word (VLIW) instructions from a control graph having a plurality of nodes, the apparatus comprising:

means for determining live-out sets for the plurality of nodes, the live-out sets and the control graph defining a VLIW flow graph;

means for determining an interference graph from the VLIW flow graph, the interference graph comprising VLIW nodes in which every VLIW node of the interference graph corresponds to one VLIW instruction;

means for inserting an undirected edge into the interference graph between two VLIW nodes if the two VLIW instructions belong to a live-out set of the same node of the VLIW flow graph; and means for coloring the VLIW graph nodes such that adjacent VLIW nodes are colored in different colors and each color corresponds to a different VIM line.

* * * * *